US011906623B1

(12) United States Patent
Agarwal et al.

(10) Patent No.: US 11,906,623 B1
(45) Date of Patent: Feb. 20, 2024

(54) VELOCITY ESTIMATION USING LIGHT DETECTION AND RANGING (LIDAR) SYSTEM (71) Applicant: PlusAI, Inc., Santa Clara, CA (US)

(72) Inventors: Ankur Agarwal, San Jose, CA (US); Timothy P. Daly, Jr., San Jose, CA (US); Anurag Ganguli, Saratoga, CA (US)

(73) Assignee: PlusAI, Inc., Santa Clara, CA (US)

( * ) Notice: Subject to any disclaimer, the term of this patent is extended or adjusted under 35 U.S.C. 154(b) by 43 days.

(21) Appl. No.: 18/159,546

(22) Filed: Jan. 25, 2023

(51) Int. Cl.
G01S 17/00 (2020.01)
G01S 17/58 (2006.01)
G01S 7/4865 (2020.01)
G01S 17/931 (2020.01)

(52) U.S. Cl.
CPC ............ *G01S 17/58* (2013.01); *G01S 7/4865* (2013.01); *G01S 17/931* (2020.01)

(58) Field of Classification Search
USPC ....................................... 356/5.01
See application file for complete search history.

(56) References Cited

U.S. PATENT DOCUMENTS

| 11,194,048 | B1* | 12/2021 | Burbank | B60W 60/001 |
|---|---|---|---|---|
| 11,474,214 | B1* | 10/2022 | Greene | G01S 7/4863 |
| 11,500,093 | B2* | 11/2022 | Dussan | G01S 7/4817 |
| 11,562,572 | B2* | 1/2023 | Agarwal | G05D 1/0088 |
| 2020/0284883 | A1* | 9/2020 | Ferreira | G01S 17/10 |
| 2021/0356600 | A1* | 11/2021 | Burbank | G01S 17/89 |
| 2022/0107414 | A1* | 4/2022 | Maheshwari | G01S 13/588 |
| 2022/0187458 | A1* | 6/2022 | Piggott | G01S 7/4865 |
| 2022/0188553 | A1* | 6/2022 | Agarwal | G06T 7/73 |
| 2022/0308171 | A1* | 9/2022 | Greene | G01S 7/4802 |
| 2022/0308215 | A1* | 9/2022 | Dussan | G01S 17/18 |

* cited by examiner

Primary Examiner — James R Hulka
(74) Attorney, Agent, or Firm — Kilpatrick Townsend & Stockton LLP (57) ABSTRACT Techniques are described for determining whether to process a job request. An example, method can include a device emitting a first pulse using a light detection and ranging (LIDAR) system coupled to an autonomous vehicle. The device can receive a first signal reflected off of an object. The device can emit a second pulse using the system, a threshold time interval being configured for the second laser pulse to hit the object in motion. The device can receive a second signal reflected off of the object. The device can determine a first time of flight information of the first signal and a second time of flight information of the second signal. The device can determine a velocity of the object based at least in part on the first time of flight information and the second time of flight information.

20 Claims, 7 Drawing Sheets

VELOCITY ESTIMATION USING LIGHT DETECTION AND RANGING (LIDAR) SYSTEM

BACKGROUND

Various vehicles employ computing means to aid automated vehicle operation. Recently, in the automotive industry, much of the focus is on making a vehicle operate in an autonomous mode in a safe manner For an autonomous vehicle (AV) in an autonomous mode, the use of light detection and ranging (LIDAR) system can assist an automobile's computing system. A LIDAR system can include one or more LIDAR devices that are coupled to a vehicle and are operable to emit pulsed laser waves to map the distance of objects that are surrounding the vehicle. Some LIDAR systems are configured to determine the distance from surrounding objects based on time of flight (ToF) calculations. One issue with ToF LIDAR systems can be configuring the system to calculate a velocity of a surrounding object in addition to the distance.

Embodiments are directed to address these and other problems, individually and collectively.

BRIEF SUMMARY

Embodiments described herein are directed toward a method for velocity estimation using light detection and ranging (LIDAR) system. The method includes a computing device emitting a first laser pulse using a light detection and ranging (LIDAR) system and toward a field of view of the LIDAR system coupled to an autonomous vehicle, the first laser pulse being emitted at a first point in time. The method further includes the computing device receiving a first signal reflected off of an object in motion. The method further includes the computing device emitting a second laser pulse using the LIDAR system, and toward the field of view of the LIDAR system, the second laser pulse is emitted at a second point in time. The method further includes the computing device receiving a second signal reflected off of the object in motion. The method further includes the computing device determining a first time of flight information of the first signal. The method further includes the computing device determining a second time of flight information of the second signal. The method further includes the computing device determining a velocity of the object in motion based at least in part on the first time of flight information and the second time of flight information.

Embodiments can further a computing device, including a processor and a computer-readable medium including instructions that, when executed by the processor, can cause the processor to perform operations, including emitting a first laser pulse using a light detection and ranging (LIDAR) system and toward a field of view of the LIDAR system coupled to an autonomous vehicle, the first laser pulse is emitted at a first point in time. The instructions that, when executed by the processor, can further cause the processor to perform operations including receiving a first signal reflected off of an object in motion. The instructions that, when executed by the processor, can further cause the processor to perform operations including emitting a second laser pulse using the LIDAR system and toward the field of view of the LIDAR system, the second laser pulse is emitted at a second point in time. The instructions that, when executed by the processor, can further cause the processor to perform operations including receiving a second signal reflected off of the object in motion. The instructions that, when executed by the processor, can further cause the processor to perform operations including determining a first time of flight information of the first signal. The instructions that, when executed by the processor, can further cause the processor to perform operations including determining a second time of flight information of the second signal. The instructions that, when executed by the processor, can further cause the processor to perform operations including determining a velocity of the object in motion based at least in part on the first time of flight information and the second time of flight information.

Embodiments can further include a non-transitory computer-readable medium including stored thereon instructions that, when executed by a processor, causes the processor to perform operations including emitting a first laser pulse using a light detection and ranging (LIDAR) system and toward a field of view of the LIDAR system coupled to an autonomous vehicle, the first laser pulse is emitted at a first point in time. The instructions that, when executed by the processor, can further cause the processor to perform operations including receiving a first signal reflected off of an object in motion. The instructions that, when executed by the processor, can further cause the processor to perform operations including emitting a second laser pulse using the LIDAR system and toward the field of view of the LIDAR system, the second laser pulse is emitted at a second point in time. The instructions that, when executed by the processor, can further cause the processor to perform operations including receiving a second signal reflected off of the object in motion. The instructions that, when executed by the processor, can further cause the processor to perform operations including determining a first time of flight information of the first signal. The instructions that, when executed by the processor, can further cause the processor to perform operations including determining a second time of flight information of the second signal. The instructions that, when executed by the processor, can further cause the processor to perform operations including determining a velocity of the object in motion based at least in part on the first time of flight information and the second time of flight information.

Other embodiments of this aspect include corresponding computer systems, apparatus, and computer programs recorded on one or more computer storage devices, each configured to perform the actions of the methods.

Further details regarding embodiments can be found in the Detailed Description and the Figures.

DETAILED DESCRIPTION

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

An autonomous vehicle can be equipped with a sensor-based system for sensing objects surrounding the vehicle. In the automotive industry, the vehicle systems are typically either frequency-modulated continuous wave (FMCW) radar systems or time-of-flight (ToF) light ranging and detection (LIDAR) systems. These LIDAR systems can include signal processing circuitry to be used to receive a signal from a sensor device (e.g., LIDAR device) and determine the occupancy of the space surrounding the autonomous vehicle. A LIDAR device can be configured to emit laser pulses per second onto the surrounding environment. Each laser pulse can be emitted in a conical shape, where the intensity of the pulse decays over distance. The laser pulses can be emitted over a desired operating wavelength, such as the infrared, visible, or ultraviolet portions of the electromagnetic spectrum. For each emitted laser pulse, the LIDAR system can record an emission time and a direction of the laser pulse. In some instances, each LIDAR device can emit sequential laser pulses directed throughout the surrounding environment. The laser pulses can hit one or more targets, causing the pulse light to scatter and reflect off of one or more target objects.

Each LIDAR device can further include a receiver for collecting signals reflected off of the surface of one or more objects surrounding the vehicle. The LIDAR system can be configured to cause the LIDAR device to wait for a threshold period of time for the scattered light to be received by a receiver. This delay period can be based on the time for light to travel back from an expected distance that a target object may be. In the event that a receiver collects a reflected signal (e.g., a portion of scattered light), the LIDAR system can record the time of acquisition and the received signal's power. Using the time of acquisition and received signal power, the LIDAR system can calculate the coordinates (e.g., spherical coordinates, cartesian coordinates) of a point on an object from which the received signal is reflected.

One issue that can arise is that one or more objects surrounding the autonomous vehicle can be moving, and the autonomous vehicle may need to determine the velocity of the object. For example, the autonomous vehicle may be traveling on a roadway and need to adjust its trajectory based on another object on or approaching the roadway. Furthermore, to correctly calculate the new trajectory, the autonomous vehicle may need to use the velocity of the other object. As indicated above, the automotive industry generally equips autonomous vehicles with either FMCW radar systems or ToF LIDAR systems for measuring a distance from a target object. FMCW radar systems can estimate a target object's velocity by using a Doppler effect. For example, a moving FMCW radar system can transmit signals toward a target object and receive a signal reflected from the target object. The frequency of signals reflected from the target object can either increase or decrease whether the FMCW radar system is moving toward or away from the target object. The FMCW radar system can measure this Doppler shift to estimate the velocity of a target object. On the other hand, the ToF LIDAR systems do not rely on frequency modulation to determine the velocity of the target object using the emitted pulse and reflected signal.

Embodiments described herein address the above-referenced issues by providing a LIDAR system, in which emitted pulses are configured to permit the LIDAR system to determine a velocity of the target object in relation to the autonomous vehicle (e.g., ego vehicle) without frequency modulation. The LIDAR system can be configured to emit two or more laser pulses at a target object, where the laser pulses have the same azimuth and elevation and are emitted within a relatively short period of time (e.g., less than 2 milliseconds). A vehicle computer can determine a relative velocity of the target object. The vehicle computer can further use the velocity of the autonomous vehicle to determine an absolute velocity of the target object. For example, if the autonomous vehicle were traveling behind the target object at the same velocity, the distance measurements from the laser pulses would indicate no change in distance between the autonomous vehicle and the target object from the first laser pulse and the second laser pulse. However, the velocity of the autonomous vehicle is known and therefore, the vehicle computer can determine that the velocity of the target object is the same as the velocity of the autonomous vehicle. In other words, the absolute velocity of the target object can be the sum of the relative velocity of the target object (0 in the example provided above) and the velocity of the autonomous vehicle.

Given a small enough time delta between the first laser pulse and the second laser pulse, it is reasonable to assume that the laser pulse hits the same point on the target object. The time difference between a first laser pulse and a second laser pulse can be proportional to the predicted velocity of the objects that are likely to surround the autonomous vehicle.

The time difference between the first laser pulse and the second laser pulse can be configured such that both the first and second laser pulses hit the same point on the target object where the target object has moved. This can avoid situations in which an incorrectly configured time delta between the first laser pulse and the second laser pulse can lead to incorrect target object velocity measurements. For example, if the target object moves significantly slower than a projected velocity, the distance measurements calculated for the first laser pulse and the second laser pulse can indicate that the target object has zero velocity. On the other hand, if the target object moves significantly faster than the projected velocity, the second laser pulse cannot be expected to hit the same point on the target object as the first laser pulse.

Prior to discussing embodiments, some terms can be described in further detail.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

Figure 1A:
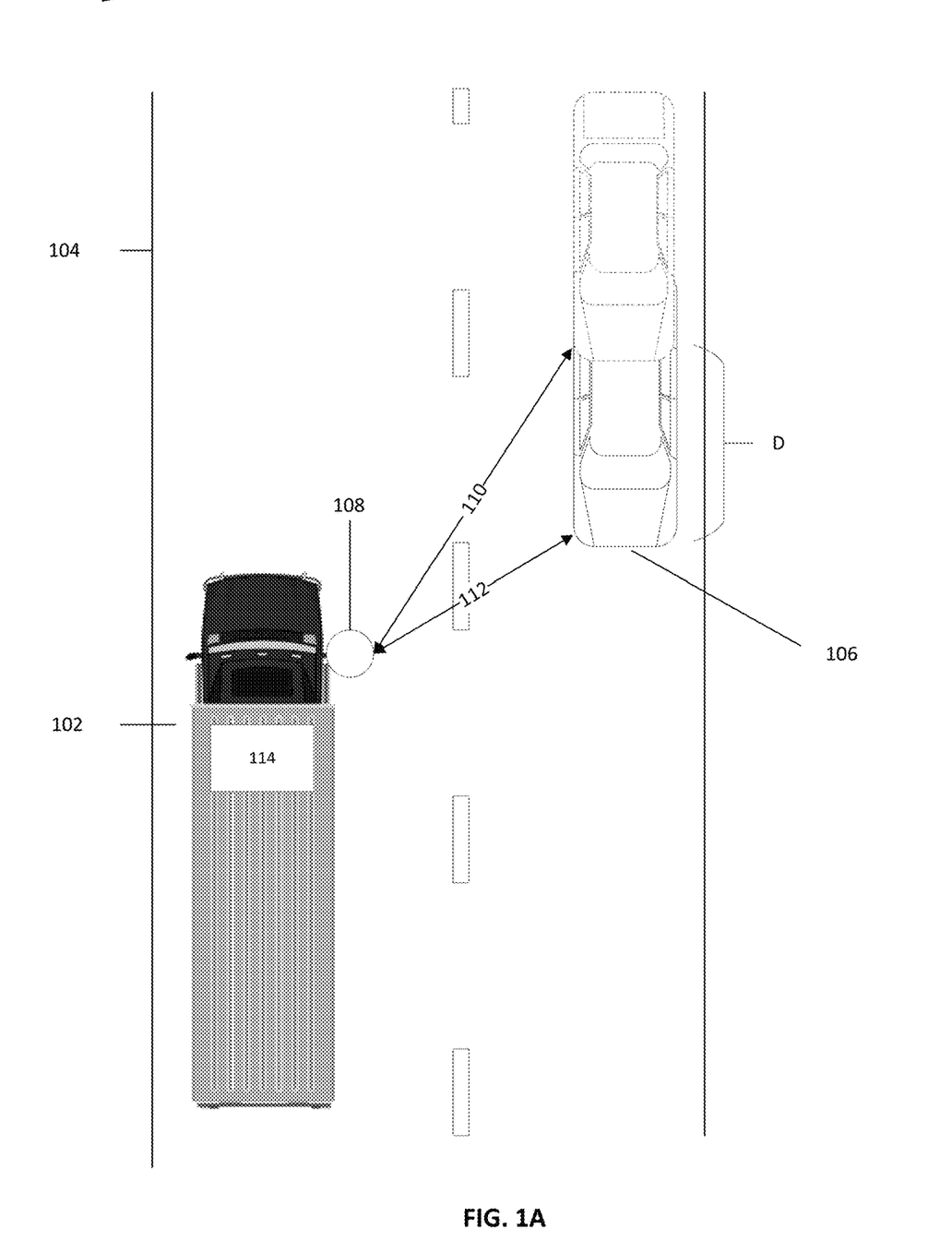
FIG. 1A is an illustration of a velocity estimation of a target object using a Time of Flight Light Detection and Ranging (LIDAR) system, according to one or more embodiments.

FIG. 1A is an illustration of a velocity estimation of a target object using a ToF LIDAR system, according to one or more embodiments. As illustrated, a first vehicle 102 is traveling in one lane of a roadway 104 and second vehicle 106 is traveling in the opposite direction of the first vehicle 102 and on a second lane of the roadway 104. According to various embodiments, the second vehicle 106 may be provided anywhere in proximity to (e.g., in front of, in the back of, on a side of) the first vehicle 102, including but not limited to the second vehicle 106 traveling in the second lane in a same direction of the first vehicle, the second vehicle 106 traveling on the same lane as the first vehicle 102. In some instances, the first vehicle 102 can be operated by a human driver. In other instances, the first vehicle 102 can be an autonomous vehicle capable of sensing its surrounding environment that can react with little to no human input.

The first vehicle 102 can be equipped with a LIDAR system that includes one or more LIDAR devices arranged about the vehicle that are each in operable communication with a vehicle computer. For example, a LIDAR device 108 can be mounted to a passenger side side-view mirror, a second LIDAR device can be mounted to a driver side side-view mirror, a third LIDAR device can be mounted to the rear of the vehicle, and so forth. Each of the first LIDAR device 108 and the second LIDAR device can be in operable communication with a vehicle computer configured for performing distance and velocity calculations. Collectively, the LIDAR devices can form a 360-degree view around the first vehicle 102. This can be an arrangement for a commercial vehicle, such as a large semi-truck. A smaller commuter vehicle, such as a sedan or sport utility vehicle (SUV) may only require a single LIDAR device arranged, for example, on the roof of the vehicle.

The LIDAR device can include a single LIDAR device or a stacked LIDAR device, wherein the single LIDAR device can include a single laser source for emitting laser pulses or more than one laser source for emitting laser pulses. In the instance that the LIDAR device includes multiple laser sources, a first laser source can be configured to emit a first laser pulse and a second laser source can be configured to emit a second laser pulse after a time offset (e.g., one and a half milliseconds). The elevation and azimuth of the signals emitted from each laser source can be configured such that each emits a signal at the same reference point (e.g., a point on a target object).

The stacked LIDAR device can include a first LIDAR device is stacked on top of a second LIDAR device. For example, the stacked LIDAR device can be a first rotating LIDAR device stacked on a second rotating LIDAR device. One of the first or second LIDAR device can be configured to emit a first laser pulse. The other of the first or second LIDAR device can be configured to emit a second laser pulse after a small time interval (e.g., one and a half milliseconds).

The LIDAR device 108 can be configured to emit laser pulses from one or more laser sources to the surrounding environment. As indicated above, the first vehicle can include multiple LIDAR devices and each LIDAR device can emit signals from one or more laser sources that reflect off of target objects and are collected by a LIDAR device. Therefore, the LIDAR device 108 needs to minimize the interference caused by the signals emitted from other LIDAR devices. Therefore, each emitted laser pulse can be coded, including modifying the signal for one or more desired frequencies and amplitudes. In effect, a point on the target object is hit with a set of pulses defined by the coding technique, rather than a single laser pulse. The first laser pulse 110 can be encoded to include an identifier. As the first LIDAR's transmitter transmits the first laser pulse 110, it can record the identifier and the time of emission. Similarly, the 9 second laser pulse 112 can include an identifier for the emitted laser pulse.

The first laser pulse 110 can hit a point on the second vehicle 106 at a first point in time, $T_0$. The LIDAR device 108 can be configured to emit the second laser pulse 112 at a second point in time $T_1$ that follows the first point in time $T_0$. The time delta, $\Delta T$, between the first point in $T_0$ and $T_1$ can be configured such that the first laser pulse 110 is emitted and hits a point on the second vehicle 106, and the second laser pulse 112 is emitted and hits the same point on the second vehicle 106.

The second vehicle 106 has been illustrated at a third point in time $T_0'$ in dashed lines and at a fourth point in time $T_1'$ in solid lines and traveling in an opposite direction from the first vehicle 102. The difference between $T_0$ and $T_0'$ is a time for the first laser pulse 110 to be emitted from the LIDAR device 108 and hit the second vehicle 106. The difference from $T_1$ and $T_1'$ is a time for the second laser pulse 112 to be emitted from the LIDAR device 108 and hit the second vehicle 106. As illustrated, it can be seen that the first laser pulse 110 and the second laser pulse 112 each hit the second vehicle at the passenger-side front headlight.

The LIDAR device 108 can include a receiver for receiving a signal reflected from the second vehicle 106. For example, the LIDAR device 108 can include a lens that can receive the reflected signal. The LIDAR device 108 can further include circuitry for converting the reflected signal into an electrical signal. The LIDAR device 108 can further record an arrival time for the reflected signal and demodulate the signal to a multi-bit stream. The LIDAR device 108 can compare all or a portion of the multi-bit stream of the reflected signal to all or a portion of the multi-bit stream of the first laser pulse 110 to determine whether the reflected signal is a reflection of the first laser pulse 110. Similarly, the LIDAR device 108 can compare all or a portion of the multi-bit stream of each received reflected signal to all or a portion of the multi-bit stream of the second laser pulse 112 to determine whether the reflected signal is a reflection of the second laser pulse 112. It should be appreciated that in a real-world scenario, the LIDAR device 108 will receive noise in the form of signals that have not been reflected from the point on the target object. The LIDAR device 108 can minimize the noise by comparing the identifiers of the emitted signals with the received signals. The received signals that either include identifiers that do not match the identifiers of the emitted signals or do not include an identifier can be discarded by the vehicle computer as noise.

The vehicle computer 114 can use the recorded emission time for the first laser pulse 110 and the arrival time of the reflected signal associated with the first laser pulse 110 to determine a distance between the LIDAR device 108 and the point on the second vehicle 106. As indicated above, an automotive vehicle can include a LIDAR system, which can include a LIDAR device in operable communication with a vehicle computer. This distance can be a first distance at the third point in time $T_0'$. For example, the vehicle computer 114 can use a time-of-flight (ToF) technique to determine the distance. The ToF technique is described in more particularity with respect to FIG. 2. The vehicle computer 114 can similarly determine a second distance between the point on the second vehicle 106 and the LIDAR device 108 at the fourth point in time $T_1'$.

The vehicle computer 114 can then calculate an absolute value of the difference between the first distance and the second distance. The vehicle computer 114 can also calculate a time difference between the emission of the first laser pulse 110 and the emission time of the second laser pulse 112. The vehicle computer 114 can calculate the absolute value of the difference between the first distance and the second distance by the time difference between the emission of the first laser pulse 110 and the emission time of the second laser pulse 112 to determine the velocity of the second vehicle 106.

Figure 1B:
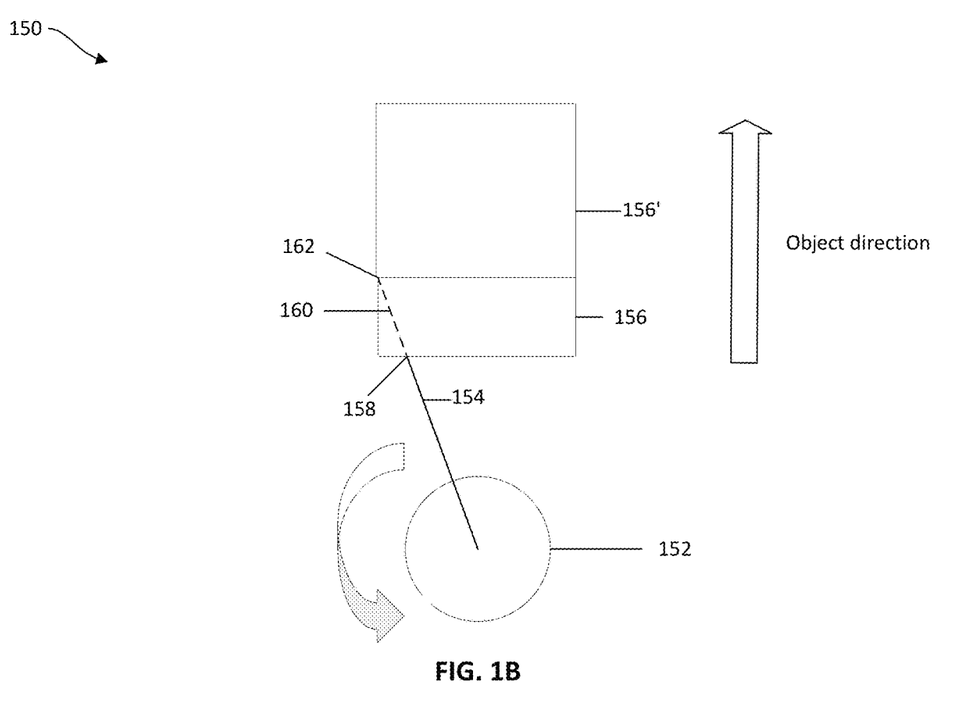
FIG. 1B is an illustration of velocity detection by a LIDAR system, according to one or more embodiments.

FIG. 1B is an illustration 150 of velocity detection by a LIDAR system, according to one or more embodiments. As illustrated, a LIDAR device 152 has emitted a first laser pulse 154 at an object in motion 156. For illustration purposes, the first laser pulse 154 is illustrated as a solid line. As further illustrated by the arrow, the object in motion 156 is moving in a direction away from the LIDAR device 152. The first laser pulse 154 can hit the object in motion 156 at a first point 158 at a first point in time, To, and at a first position. The LIDAR device 152 can further be configured to emit a second laser pulse 160 at the object in motion. The second laser pulse 160 is illustrated as a dashed line. As illustrated, a portion of the first laser pulse 154 overlaps the second laser pulse 160 as both pulses are configured to converge at the same point on the object in motion 156. The second laser pulse 160 can hit the object in motion 156' at a second point in time, $T_1$, and at a second point 162. The first point 158 and the second point 160 can relatively be the same point on the object in motion. For example, if the object in motion is a vehicle, both the first laser pulse 154 and the second laser pulse 160 can strike the vehicle on the driver-side of the rear bumper.

The LIDAR device 152 can include multiple laser sources, where a first laser source is configured to transmit a first laser pulse and a second laser source is configured to emit a second laser source within a small time interval (e.g., less than two milliseconds) of the first laser pulse. The first laser source and the second laser source can be configured to be phase-locked, such that the phase on the first laser pulse is synchronized with the phase of the second laser pulse. In other words, the frequency and amplitude of each of the pulses is the same.

The LIDAR device 152 can further receive a signal reflected from the first point 158 and a signal reflected from the second point 162. A vehicle computer can further use the emissions times of each of the laser pulses and reception times of each of the reflected signals to calculate a first distance of the object in motion 156 at $T_0$ and a second distance of the object in motion 156' at $T_1$. The vehicle computer can further calculate the velocity of the object in motion based on the first distance, the second distance, and the emissions times of the first laser pulse 158 and the second laser pulse 162 to calculate a velocity of the object in motion. Calculating the velocity of the object in motion is described in more particularity with respect to FIG. 2.

Figure 1C:
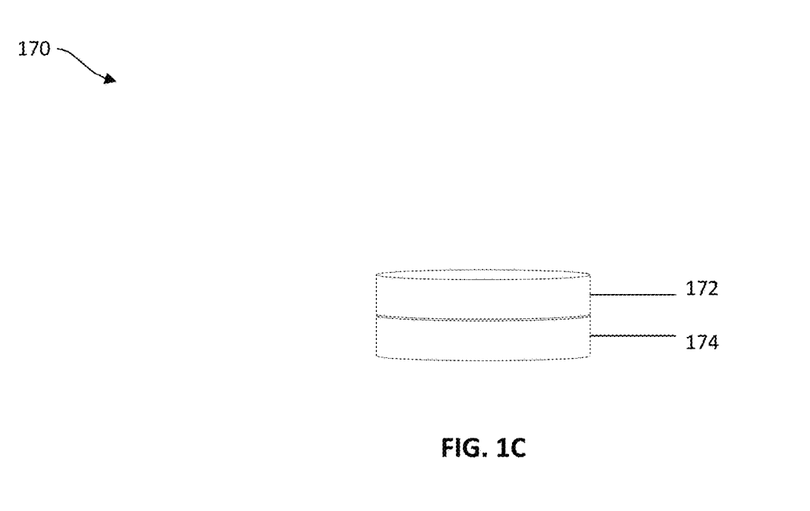
FIG. 1C is an illustration of a stacked LIDAR configuration, according to one or more embodiments.

FIG. 1C is an illustration 170 of a stacked LIDAR configuration, according to one or more embodiments. The stacked LIDAR device can include a first LIDAR device 172 and a second LIDAR device 174. Each of the first LIDAR device 172 and the second LIDAR device 174 can include a controller coupled to a respective laser source (e.g., laser diode). The controller can be a joint controller that controls the laser source for each LIDAR device. In addition to controlling a frequency of the laser pulses, the controller can further control an elevation and an azimuth for the laser pulses emitted from each LIDAR device. The joint controller can further be coupled to a processing unit for configuring control instructions for configuring a time delay between a first laser pulse emitted by the first LIDAR device 172 and a second laser pulse emitted by the second LIDAR device 174. As illustrated in FIG. 1B above, the time delay can be configured to hit the same point on an object in motion. For example, the first LIDAR device 172 can be configured to emit a first laser pulse and the second LIDAR device 174 within 2 milliseconds of the first laser pulse. It is reasonable to assume that given the relatively short time interval, that both the first laser pulse and the second laser pulse hit the same point on the object in motion.

Figure 2:
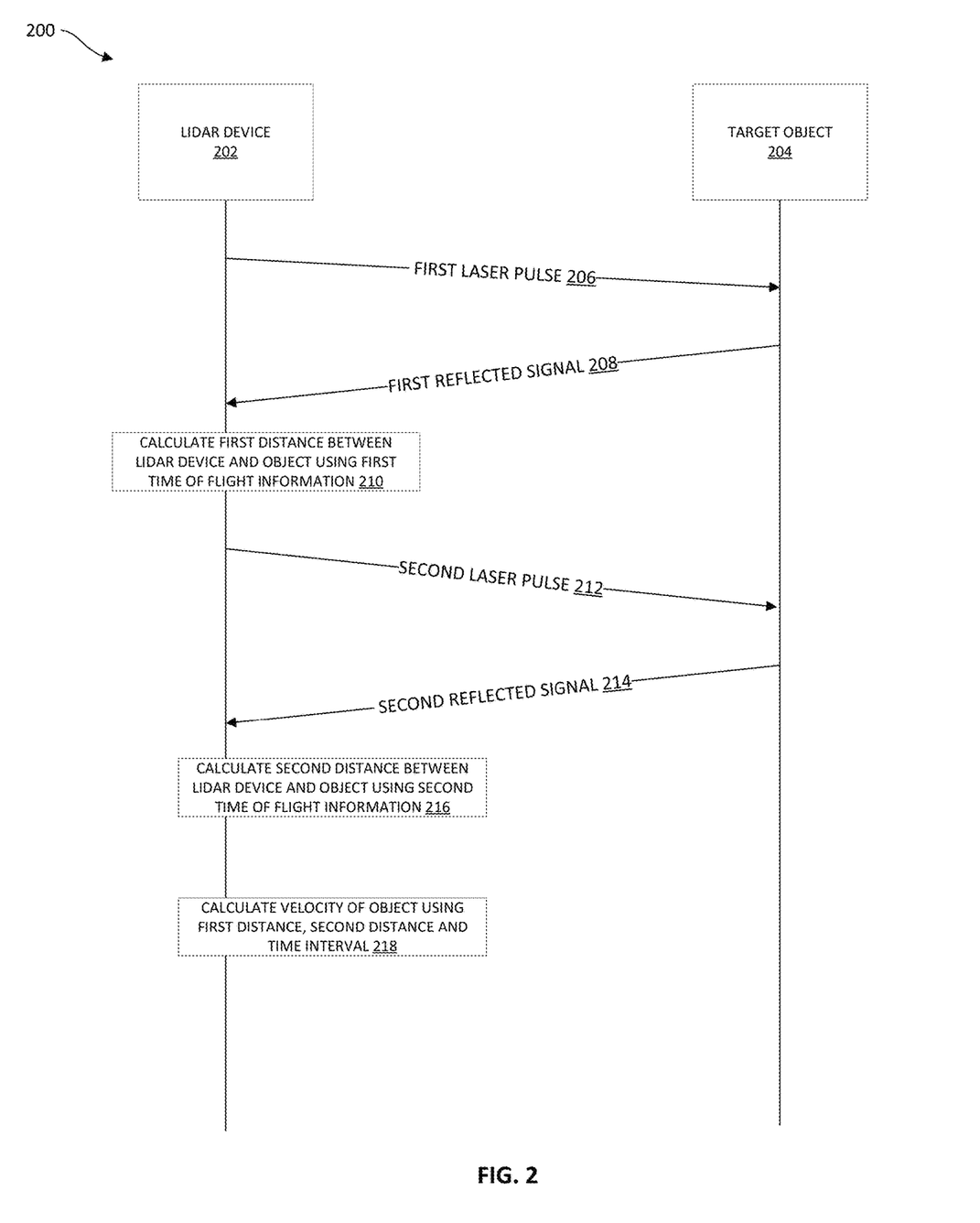
FIG. 2 is a process flow for determining a velocity of an object using time-of-flight LIDAR, according to one or more embodiments.

FIG. 2 is a process flow 200 for determining a velocity of an object using time-of-flight LIDAR, according to one or more embodiments. While the operations of processes 200 and 400 are described as being performed by generic computers, any suitable device may be used to perform one or more operations of these processes. Processes 200 and 400 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

A LIDAR device 202 can be in proximity to a target object 204, such that the target object 204 is in the field of view of the LIDAR device 202. The LIDAR device 202 can include a controller coupled to a laser source (e.g., laser diode) for emitting a laser pulse. The controller can further be coupled to a processing unit for configuring control instructions to encode the laser pulse emitted by the laser diode and configuring a time delay between a first laser pulse and a second laser pulse. In some instances, the LIDAR device can further include a moveable mirror for directing the direction of the laser beam and assisting with the encoding process. The encoded laser pulse can be emitted through a lens for focusing the laser pulse toward a target object 204 or area.

The LIDAR device 202 can be configured to emit laser pulses to project different can patterns. The LIDAR device 202 can be a rotating LIDAR device or a non-rotating LIDAR device and use a mirror, or in some instances a prism or grating to create different scan patterns. For example, the LIDAR device 202 can be configured to oscillate the mirror to create a jagged snaking pattern. In other instances, the LIDAR device mirror can be a polygonal mirror. For example, the polygonal mirror can include an octagonal contour. The LIDAR device can be configured to rotate the polygonal mirror to create parallel and linear scan patterns. As indicated above, the LIDAR device can include a dispersive prism or dispersive grating. In these instances, the LIDAR device can be configured to rotate the prism or grating to create circular patterns. It should be appreciated that the LIDAR device can be configured to project other scan patterns.

As indicated above and throughout this disclosure, the LIDAR system can be configured to emit a first laser pulse and a second laser pulse to determine a distance and a velocity of a target object. In some instances, the first laser pulse and the second laser pulse are emitted from the same LIDAR device, and in other instances, the pulses are emitted from one LIDAR device stacked on another LIDAR device. In each situation, the scan pattern used for emitting the first laser pulse can be the same scan pattern used for emitting the second laser pulse, regardless of whether the pulses are emitted from a single LIDAR source or multiple LIDAR sources.

The LIDAR lens can further collect a signal reflected from a target object. The LIDAR device 202 can further include a photodiode for converting the reflected signal into an electrical signal. The processing unit can receive the electrical signal to use information from the emitted signal and reflected signal to calculate a velocity of the target object 204.

The target object 204 can be any object that is hit with the emitted signal and reflects a signal back to the LIDAR device 202. For example, the target object 204 can be a car driving on the road, an aircraft (e.g., a drone) flying in the sky, or other object in proximity to the LIDAR device 202.

At 206, the LIDAR device 202 can emit a first laser pulse that hits a target object 204 in its field of view. In particular, the first laser pulse can hit a point on the target object 204. The LIDAR device 202 can record the emission time and a direction of the laser pulse. The LIDAR device 202 can further encode the first laser pulse to identify the first laser pulse.

At 208, the LIDAR device 202 can receive a first reflected signal and demodulate the signal to extract information from the signal. In particular, the LIDAR device 202 can extract information to determine that the reflected signal is associated with the emitted signal. The LIDAR device 202 can further record a reception time for the first reflected signal.

At 210, a vehicle computer in operable communication with the LIDAR device 202 can calculate a first distance between the LIDAR device 202 and the point on the target object 204 using a first LIDAR information. For example, the vehicle computer can use the following formula:

$$D=(c(T_1-T_0))/2, \quad (1)$$

where D is the distance between the LIDAR device 202 and the point on the target object 204, c is the speed of light, $T_1$ is the reception time for receiving the reflected signal by the LIDAR device 202 at step 208, and $T_0$ the emission time for transmitting the first laser pulse at step 206. It should be appreciated that this step can be performed at any point after receipt of the reflected signal. For example, this step can be performed after or in parallel to the second laser pulse or after a second reflected signal is received.

At 212, the LIDAR device 202 can transmit a second laser pulse that has the same azimuth and elevation as the first laser pulse of step 206. The LIDAR device 202 can be configured to transmit the second laser pulse within a small time window from the first laser pulse being emitted. If each of the first laser pulse and the second laser pulse are emitted within a small time window and having the same azimuth and elevation, it is reasonable to assume that both the first laser pulse and the second laser pulse hit the same point on the target object. The LIDAR device 202 can further encode the second laser pulse to represent a bit-stream that identifies the second laser pulse.

At 214, the LIDAR device 202 can receive a second reflected signal and demodulate the signal to extract information from the signal. In particular, the LIDAR device 202 can extract information to determine that the reflected signal is associated with the emitted signal. The LIDAR device 202 can further record a reception time for the first reflected signal.

At 216, the vehicle computer can calculate a second distance between the LIDAR device and the point on the target object 204 using the same method as described in step 210 above.

At 218, the vehicle computer can calculate a velocity of the target object using the difference between the first distance, D1, and second distance, D2. And a time interval between the emission of the second laser pulse and the emission of the first laser pulse. For example, the LIDAR device 202 can use the following formula, $$V=|(D1-D2)|/(T_1-T_0), \quad (1)$$

where V is the velocity of the target object 204, D1 is the first distance, D2 is the second distance.

This velocity, V, can be a relative velocity of the target object. $T_0$ determine an absolute velocity of the target object, the vehicle computer can consider a velocity of the autonomous vehicle that includes the LIDAR system. In some embodiments, the vehicle computer system can determine the absolute velocity of the target object as the sum of the relative velocity of the target object and the velocity of the autonomous vehicle. For example, the autonomous vehicle can be traveling a 60 mph and emit a first laser pulse and a second laser pulse that reflect off of the target object. The vehicle computer can determine the velocity, V, of the target object as described above, which in this example can be 5 mph relative to the autonomous vehicle (e.g., the target object is increasing its distance from the autonomous vehicle). The vehicle computer can sum the relative velocity of the target object and the velocity of the autonomous vehicle to determine that the absolute velocity (e.g., 65 mph).

In some instances, the target object can have an absolute velocity that is lower than the velocity of the autonomous vehicle. For example, the vehicle computer can determine that the distance between the autonomous vehicle and the target object using the time of flight information from the first laser pulse is greater than the distance between the autonomous vehicle and the target object using the time of flight information from the second laser pulse. In this instance, the vehicle computer can attribute a negative value to the relative velocity of the target object (e.g., −2 mph). Therefore, the vehicle computer can sum the relative velocity of the target object and the velocity of the autonomous vehicle to determine that the absolute velocity (e.g., 58 mph).

Figure 3:
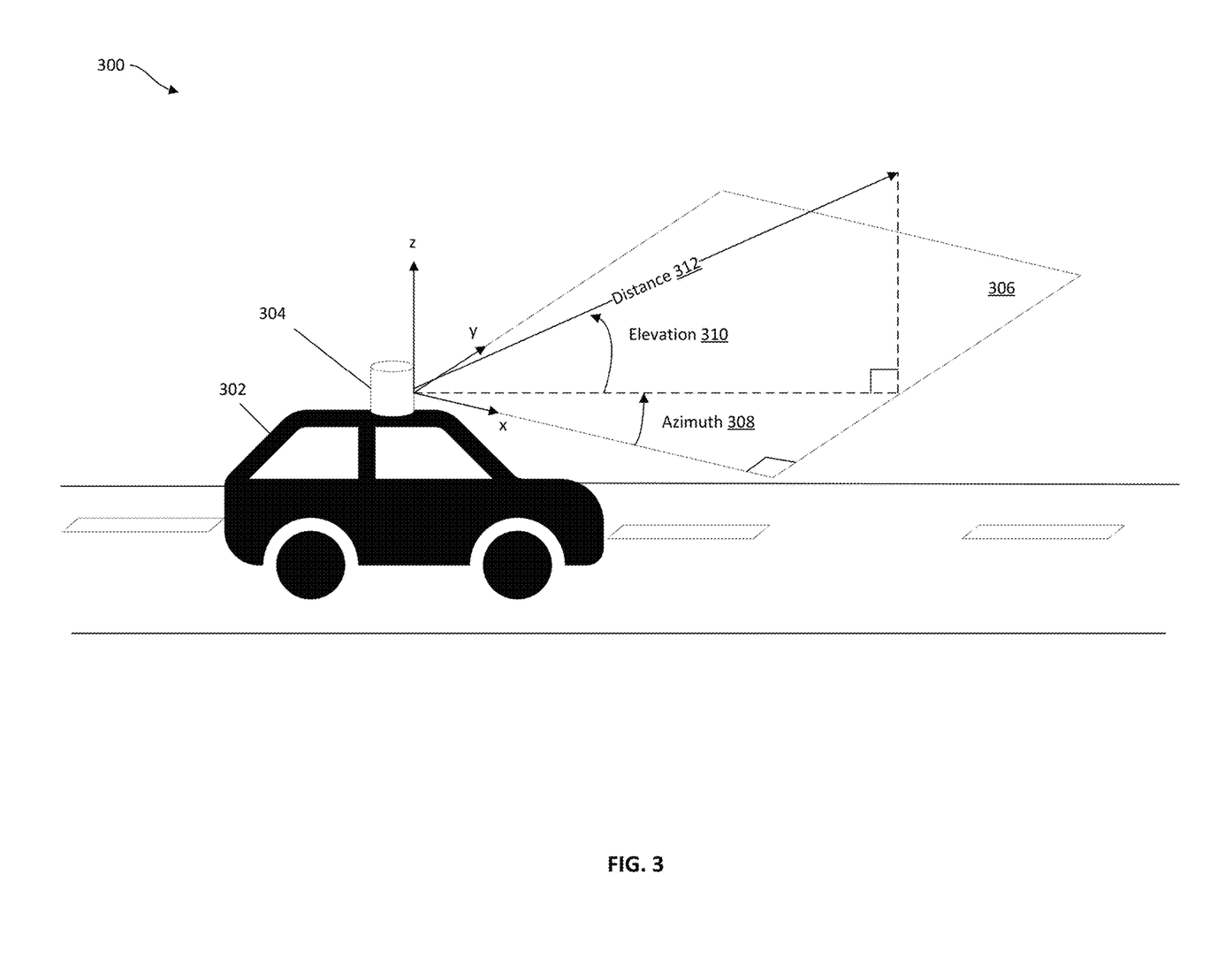
FIG. 3 is an illustration of a LIDAR mounted on a vehicle, according to one or more embodiments.

FIG. 3 is an illustration of a LIDAR mounted on a vehicle, according to one or more embodiments. A vehicle 302 with a LIDAR device 304 mounted on the roof is illustrated driving along a road. The LIDAR device 304 can measure the position of a point on a target object in a multi-dimensional coordinate system (e.g., a spherical coordinate system).

In a spherical coordinate system, a point on a target object can be defined by an azimuth (θ) 308 and an elevation (φ) 310, and a distance 312 from the LIDAR device 304 to a point on a target object. The azimuth (θ) 308 and the elevation (φ) 310 are angles that can be used to define a direction of a laser pulse emitted from the LIDAR device 304. The azimuth (θ) 308 is in the x-y plane, whereas the elevation (φ) 310 is in the y-z plane. The azimuth (θ) 308 can be determined by the positions of the laser when it emits a laser pulse and a position that is registered at the time of emitting the laser pulse. The elevation (φ) 310 can be a fixed value. The distance D can be determined by a Time-of-Flight (ToF) calculation as described above.

The LIDAR device 304 can be configured to emit a first laser pulse and a second laser pulse, where each pulse has the same azimuth (θ) and elevation (φ). The LIDAR device 304 can further be configured to transmit the second laser pulse within a very small time interval from the first laser pulse. The time interval between the first laser pulse and the second laser pulse can be less than two milliseconds. In some instances, the time interval between the first laser pulse and the second laser pulse can be one and a half milliseconds. Given that the first laser pulse and the second laser pulse have the same azimuth (θ) and elevation (φ) and the time interval is so small, it is reasonable to assume that the first and second laser pulses hit the same point on a target object.

As indicated above, the distance, D, can be calculated using a Time-of-Flight (ToF) calculation. A vehicle computer can calculate a first distance associated with the first laser pulse and a second distance associated with the second laser pulse. The first distance can either be greater or lesser than the second distance. For example, if the target object is either moving toward the vehicle 302 or moving in the same direction as the vehicle 302 but with less velocity, the second distance can be less than the first distance. If, however, the target object is moving in the same direction as the vehicle and at a greater velocity, the second distance can be greater than the first distance.

Figure 4:
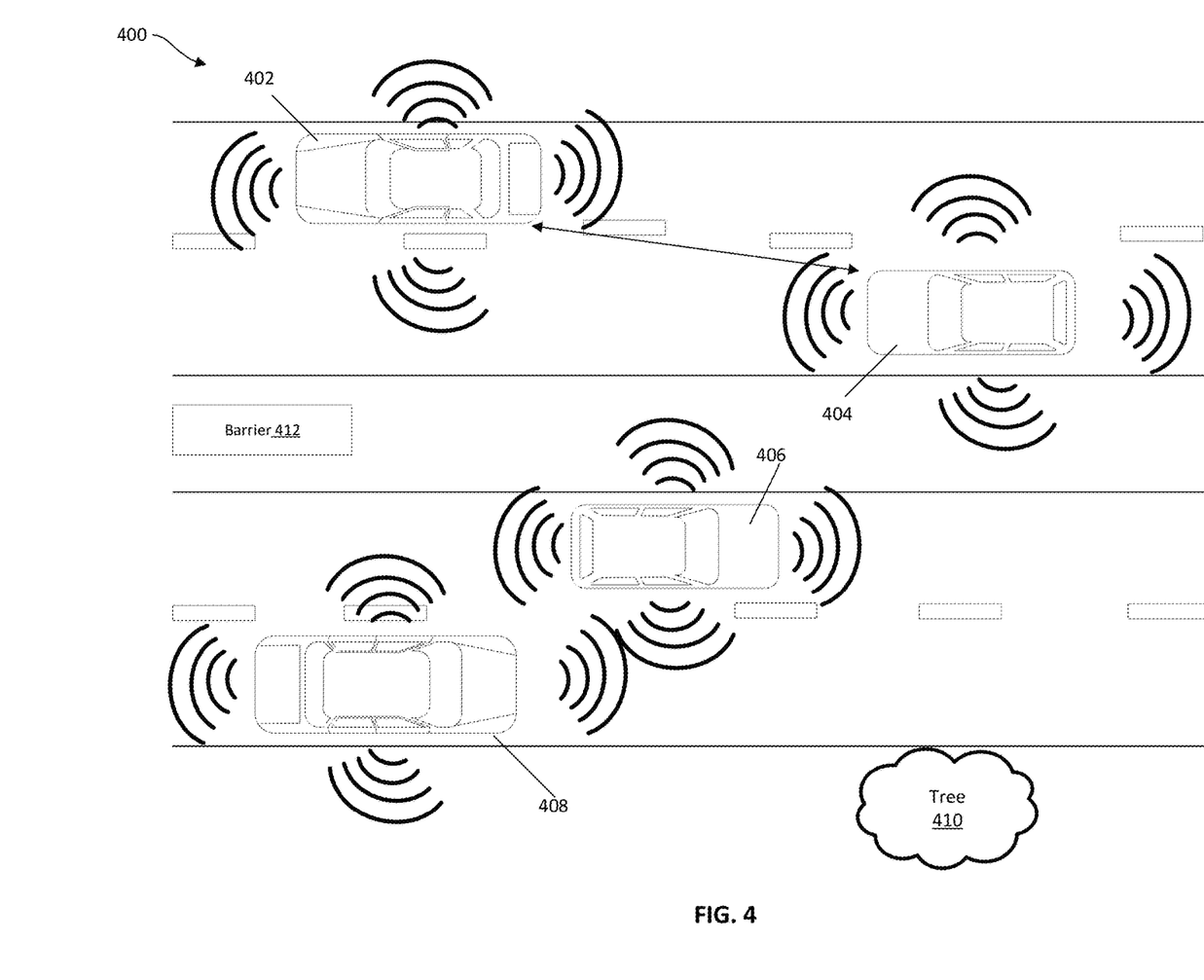
FIG. 4 is an illustration of velocity detection using a Time-of-Flight LIDAR, according to one or more embodiments.

It should be appreciated that in some instances, the LIDAR system 108 or 304 can be a stacked LIDAR system, where a first LIDAR device is stacked on top of a second LIDAR device. One of the first or second LIDAR device can be configured to emit a first laser pulse. The other of the first or second LIDAR device can be configured to emit a second laser pulse after a small time interval (e.g., one and a half milliseconds). Whereas the LIDAR described above is configured to emit the first laser pulse and second laser pulse from a single transmitter, the stacked LIDAR device is configured to transmit the first laser pulse from one LIDAR device and the second laser pulse from the other LIDAR device. The first LIDAR device can have a controller in communication with a controller of the second LIDAR device. The controller can cause the first LIDAR device to be phase-delayed with the second LIDAR device such that the emitted signals from each device are offset in terms of the phases of each emitted laser pulse signal from the first LIDAR device and the second LIDAR device. The transmitter for the first LIDAR device and the transmitter can be in a stacked arrangement with the transmitter for the second LIDAR device. Therefore, the first LIDAR device and the second LIDAR device can be configured to emit laser pulses with respective elevations that would cause the trajectory of the laser pulse to hit the same point on a target object. In particular, the azimuth and elevation of the laser pulses emitted from the first LIDAR device can be offset from the azimuth and elevation of the laser pulses emitted from the second LIDAR device, based on an alignment of the laser sources of each device. For example, in the instance that one laser source is stacked on top of another laser source, the first elevation of the first LIDAR device can be offset from the second elevation of the second LIDAR, such the laser pulses emitted from each laser source converge to a same reference point (e.g., point on a target object). FIG. 4 is an illustration of velocity detection using a Time-of-Flight LIDAR, according to one or more embodiments. As illustrated, a first vehicle 402 and a second vehicle 404 are traveling on a roadway in one direction. A third vehicle 406 and a fourth vehicle 408 are traveling on an adjacent roadway in an opposite direction. Each of the vehicles has been equipped with an array of LIDAR devices arranged about the vehicles. Each vehicle's array of LIDAR devices permits a 360-degree scan of the environment surrounding the respective vehicle. From each vehicle's perspective, each other vehicle is a moving occupant in the surrounding environment. For example, for the first vehicle 402, each of the second vehicle 404, third vehicle 406, and the fourth vehicle 408 are moving occupants that the first vehicle 402 should be aware of. In addition to other vehicles, FIG. 4 illustrates objects on or about the roadway that do not have a velocity, such as a tree 410 or a median barrier 412.

It can be seen that each vehicle is continuously emitting a LIDAR signal and that each of these signals can be reflected from one or more moving or non-moving objects in proximity to the vehicles. Furthermore, the emitted and reflected signals for one LIDAR device can cause interference, if received by another LIDAR device. Through encoding, the laser pulses of each LIDAR device for each vehicle can distinguish laser pulses emitted from other LIDAR devices. For example, each LIDAR device can include an encoder that can encode each laser pulse with a set of pulse characteristics that can be used to distinguish one signal from another signal. For example, when making velocity measurements, a first laser pulse can be encoded with a first set of laser pulse characteristics and the second laser pulse can be encoded with a second set of laser pulse characteristics. Each LIDAR device can be configured to encode its emitted laser pulse with respective encodings.

Each LIDAR device can further be configured to emit a first laser pulse and a second laser pulse within a small time interval of the first laser pulse. As indicated above, the time interval between the first laser pulse and the second laser pulse can be one and a half milliseconds. For example, the second vehicle 404 can include a LIDAR device that emits a first laser and a second laser pulse one and a half seconds after the first laser pulse. The laser pulses can be encoded to be identifiable with the LIDAR device. The first LIDAR device can record a respective emission time for each laser pulse. Each of the first laser pulse and the second laser pulse can hit the driver-side taillight of the first vehicle 402 and reflect back to the LIDAR device. The LIDAR device can demodulate each reflected signal and determine that the source of the reflected signals is the first laser pulse or the second laser pulse. The LIDAR device can further record a reception time of each reflected signal. In response to determining that the source of the reflected signals is the first laser pulse and the second laser pulse. The LIDAR device can calculate a first distance from the LIDAR device and the taillight of the first vehicle 402 using information associated with the first laser pulse and the reflected signal. The LIDAR device calculates a second distance from the LIDAR device and the taillight of the first vehicle 402 using information associated with the second laser pulse and the reflected signal.

A vehicle computer can further use the first distance, second distance, and the emission times to calculate a velocity of the first vehicle 402. For example, the vehicle computer can calculate the absolute value of the difference between the first distance and the second distance. The vehicle computer can further calculate a time interval between the emission time of the first laser pulse and an emission time of the second laser pulse. The vehicle computer can then divide the difference between the first distance and the second distance by the time interval to determine the velocity of the first vehicle 402.

Figure 5:
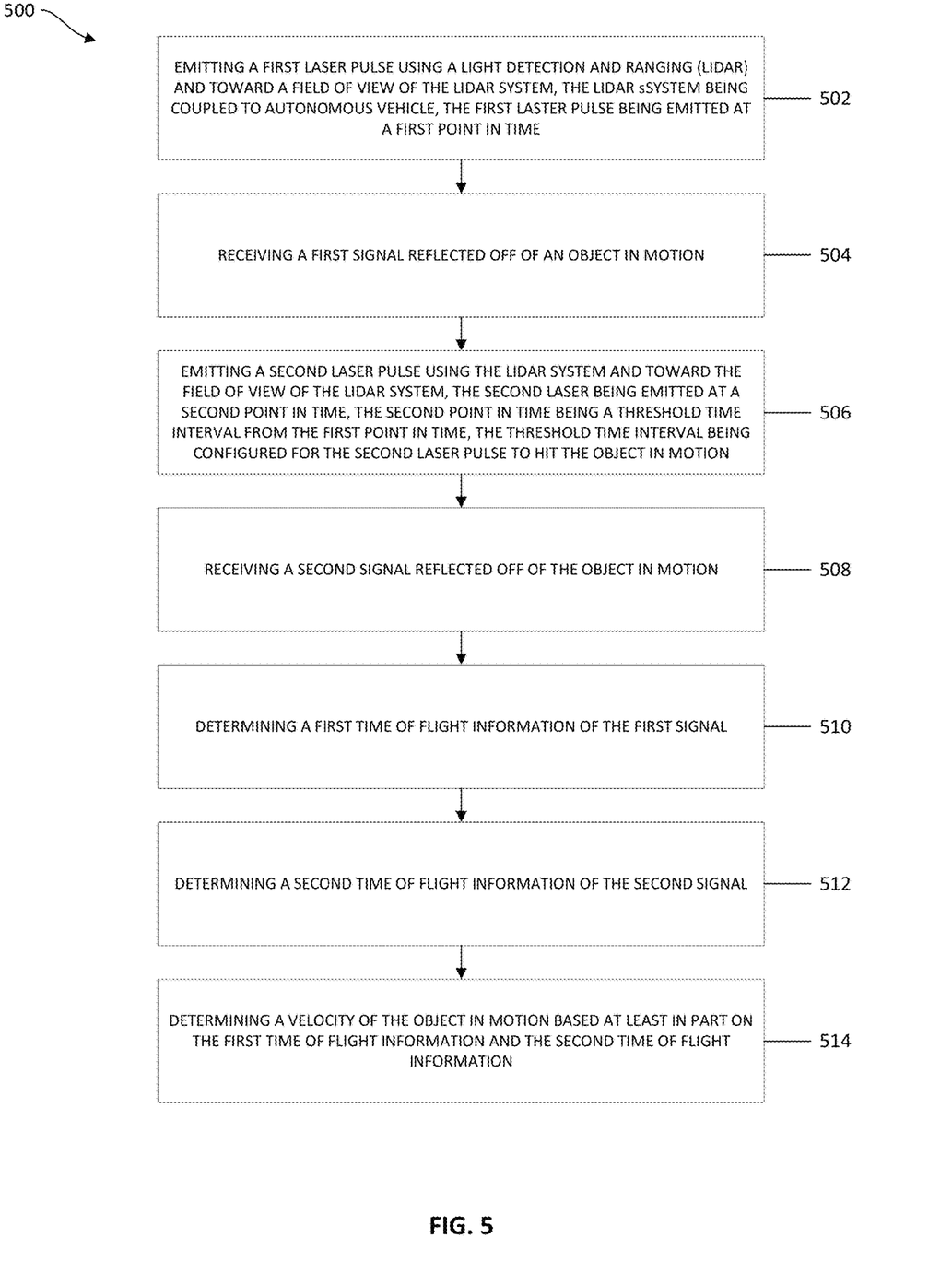
FIG. 5 is a process flow for estimating a velocity of a target object using a Time-of-Flight LIDAR, according to one or more embodiments.

FIG. 5 is a process flow 500 for estimating a velocity of a target object using a Time-of-Flight (ToF) LIDAR, according to one or more embodiments. At 502, the method can include a computing device emitting a first laser pulse using a light detection and ranging (LIDAR) device and toward a field of view coupled to an autonomous vehicle, the first laser pulse being emitted at a first point in time. The computing device can include a LIDAR system, which includes a LIDAR device in operable communication with a vehicle computer. The first laser pulse can be encoded, for example, by an encoder to provide the pulse with a set of identifiable pulse characteristics. The computing device can be incorporated with or coupled to a LIDAR device, such as a mobile LIDAR device mounted to a vehicle or a static LIDAR device positioned to scan a target environment (e.g., a speed detector on the side of a roadway).

The direction of the first laser pulse can have a first azimuth and a first elevation. The computing device can further record the first azimuth, the first elevation, and an emission time for the first laser pulse.

At 504, the method can include the computing device receiving a first signal reflected off of an object in motion. Once the first laser pulse has been emitted, the pulse can hit a point on a target object in motion. For example, the first laser pulse can hit a license plate character on a vehicle traveling in front of the autonomous vehicle.

At 506, the method can include the computing device emitting a second laser pulse using the LIDAR device and toward the field of view of the LIDAR device. For example, the computing device may control the LIDAR device to emit the first laser pulse. The second laser pulse may be emitted at a second point in time, the second point in time being a threshold time interval from the first point in time, the threshold time interval being configured for the second laser pulse to hit the object in motion. For example, the threshold time interval can be one and a half milliseconds. The threshold time interval can be based on expected velocities of objects surrounding the autonomous vehicle. For example, the threshold time interval for an autonomous vehicle traveling primarily on highways can be smaller than a threshold time interval for an autonomous vehicle traveling through residential neighborhoods as vehicles traveling on the highway can be expected to travel faster than vehicles traveling on a roadway in a residential neighborhood.

The direction of the second laser pulse can have a second azimuth and a second elevation, which are the same as the first azimuth and the first elevation. The computing device can further record the second azimuth, the second elevation, and an emission time for the first laser pulse.

At 508, the method can include the computing device receiving a second signal reflected off of the object in motion. Once the second laser pulse has been emitted, the pulse can hit a point on a target object in motion. The threshold time interval can be such that the second laser pulse is emitted within a small enough time window that the second laser pulse also hits the same object as the first laser pulse, even though the target object is moving. For example, the second laser pulse can also hit the license plate character on a vehicle traveling in front of the autonomous vehicle.

In some instances, receiving the first laser pulse or the second laser pulse includes filtering received signals. The filtering can include storing and removing received signal data information based on an analysis of the signal characteristics of each received signal. Received signal information can be saved or removed based on various characteristics, such as frequency, amplitudes and a time interval between emission of a laser pulse and reception of a received signal. For example, if a signal is received in less than a threshold time interval after emission of a laser pulse or greater than a threshold time interval after emission of the laser pulse, the received signal information can be deleted.

At 510, the method can include the computing device determining a first time of flight information of the first signal. The time of flight information can include an emission time of the first laser pulse, a reception time of the first signal, and a time interval between the emission time and the reception time. The time of flight information can further include a first distance calculated using the time interval between the emission time and the reception time.

At 512, the method can include the computing device determining a second time of flight information of the second signal. The time of flight information can include an emission time of the first laser pulse, a reception time of the first signal, and a time interval between the emission time and the reception time. The time of flight information can further include a second distance calculated using the time interval between the emission time and the reception time.

At 514, the method can include the computing device determining a velocity of the object in motion based at least in part on the first time of flight information and the second time of flight information. For example, the computing device can calculate the absolute value of the difference between the first distance and the second distance. The computing device can further calculate a time interval between the emission time of the first laser pulse and an emission time of the second laser pulse. The computing device can then divide the difference between the first distance and the second distance by the time interval to determine the velocity of the first vehicle 402. As indicated above, the computing device an initially determine a relative velocity of the object in motion, and use the velocity of the autonomous vehicle to determine the absolute velocity of the object in motion.

The above description and accompanying FIGs. provide a methodology for determining a velocity of a surrounding object using a LIDAR system configured for ToF calculations rather than analysis of Doppler effect. A LIDAR system can be configured to emit two laser pulses within a small time window. The LIDAR system can include multiple configurations of LIDAR devices, such as a single LIDAR device with multiple laser sources, or a stacked configuration in which one LIDAR device is stacked on top of another LIDAR device.

The LIDAR system can emit a first laser pulse from a LIDAR device at a first point in time and receive a signal reflected off of a moving object. The LIDAR system can calculate a first distance from the moving object and the LIDAR device. The LIDAR system can further emit a second laser pulse from the LIDAR device (e.g., single LIDAR device or stacked LIDAR device) and calculate a second distance from the moving object and the LIDAR device. Based on the first distance and the second distance, and the emission times for each laser pulse, the LIDAR system can calculate a velocity of the moving object.

Figure 6:
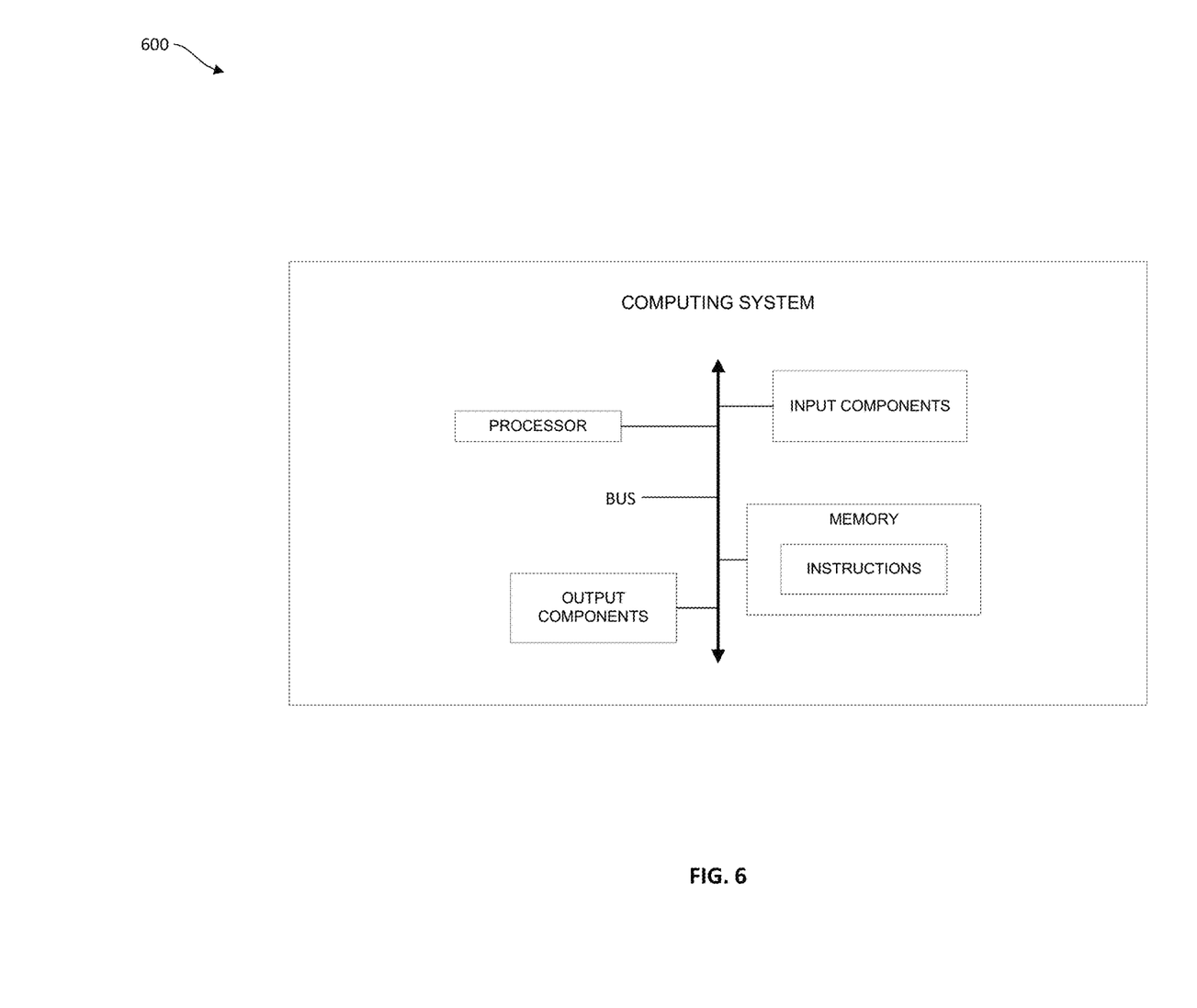
FIG. 6 is a block diagram of an example of a computing system, according to one or more embodiments.

FIG. 6 is a block diagram of an example of a computing device 600 usable for implementing some aspects of the present disclosure. The computing device 600 includes a processor 602 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. In some examples, the instructions 606 can include processor-specific instructions generated by a compiler or an interpreter from code written in any suitable computer-programming language, such as C, C++, C #, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing device 600 may also include other input and output (I/O) components. The input components 608 can include a mouse, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   configuring, by a computing device, a threshold time interval for a light detecting and ranging (LIDAR) system coupled to an autonomous vehicle, the threshold time interval configured to permit the LIDAR system to, as the autonomous vehicle is moving, emit a first laser pulse and a second laser pulse within the threshold time interval and hit a vehicle on a roadway based on an expected velocity of the vehicle;
   emitting, by the computing device, the first laser pulse using the LIDAR system, the first laser pulse being emitted at a first point in time;
   receiving, by the computing device, a first signal reflected off of the vehicle on the roadway;
   emitting, by the computing device, the second laser pulse using the LIDAR system, the second laser pulse being emitted at a second point in time within the configured threshold time interval;
   receiving, by the computing device, a second signal reflected off of the vehicle on the roadway;
   determining, by the computing device, a first time of flight information of the first signal;
   determining, by the computing device, a second time of flight information of the second signal; and
   determining, by the computing device, a velocity of the vehicle on the roadway based at least in part on the first time of flight information and the second time of flight information.

2. The method of claim 1, wherein the first laser pulse has a first azimuth, and wherein the second laser pulse has a second azimuth, the second azimuth being the same as the first azimuth.

3. The method of claim 2, wherein the first laser pulse has a first elevation, and wherein the second laser pulse has a second elevation, the second elevation being the same as the first elevation.

4. The method of claim 1, wherein determining the velocity of the vehicle on the roadway comprises:
   calculating a first distance between the LIDAR system and the vehicle on the roadway based at least in part on the first time of flight information;
   calculating a second distance between the LIDAR system and vehicle on the roadway based at least in part on the second time of flight information;
   determining a difference between the first point in time and the second point in time to determine a time interval; and
   determining the velocity of the vehicle on the roadway based at least in part on the first distance, second distance, and the time interval.

5. The method of claim 1, wherein the LIDAR system is a stacked LIDAR system comprising a first LIDAR device and a second LIDAR device stacked on the first LIDAR device, wherein the first LIDAR device is configured to emit the first laser pulse having a first elevation using a first laser source, wherein the second LIDAR device is configured to emit the second laser pulse having a second elevation using a second laser source, wherein the first elevation is offset from the second elevation, and wherein the first LIDAR device and the second LIDAR device are phase-delayed.

6. The method of claim 1, further comprising filtering the first signal and the second signal to remove noise.

7. The method of claim 1, wherein a difference between the second point in time and the first point in time is less than 2 milliseconds.

8. A device, comprising:
   a light detection and ranging (LIDAR) system coupled to an autonomous vehicle;
   a processor; and
   a computer-readable medium including instructions that, when executed by the processor, cause the processor to perform operations comprising:
      configuring a threshold time interval for the LIDAR system, the threshold time interval configured to permit the LIDAR system to, as the autonomous vehicle is moving, emit a first laser pulse and a second laser pulse within the threshold time interval and hit a vehicle on a roadway based on an expected velocity of the vehicle;
      emitting the first laser pulse using the LIDAR system, the first laser pulse being emitted at a first point in time;
      receiving a first signal reflected off of the vehicle on the roadway;

emitting a second laser pulse using the LIDAR system, the second laser pulse being emitted at a second point in time within the configured time interval;

receiving a second signal reflected off of the vehicle on the roadway;

determining a first time of flight information of the first signal;

determining a second time of flight information of the second signal; and determining a velocity of the vehicle on the roadway based at least in part on the first time of flight information and the second time of flight information.

9. The device of claim 8, wherein the first laser pulse has a first azimuth, and wherein the second laser pulse has a second azimuth, the second azimuth being the same as the first azimuth.

10. The device of claim 9, wherein the first laser pulse has a first elevation, and wherein the second laser pulse has a second elevation, the second elevation being the same as the first elevation.

11. The device of claim 8, wherein determining the velocity of the vehicle on the roadway comprises:

calculating a first distance between the LIDAR system and the vehicle on the roadway based at least in part on the first time of flight information;

calculating a second distance between the LIDAR system and the vehicle on the roadway based at least in part on the second time of flight information;

determining a difference between the first point in time and the second point in time to determine a time interval; and determining the velocity of the object in motion based at least in part on the first distance, second distance, and the time interval.

12. The device of claim 8, wherein the LIDAR system is a stacked LIDAR system comprising a first LIDAR device and a second LIDAR device stacked on the first LIDAR device, wherein the first LIDAR device is configured to emit the first laser pulse having a first elevation using a first laser source, wherein the second LIDAR device is configured to emit the second laser pulse having a second elevation using a second laser source, wherein the first elevation is offset from the second elevation, and wherein the first LIDAR device and the second LIDAR device are phase-delayed.

13. The device of claim 8, wherein the instructions that, when executed by the processor, further cause the processor to perform operations comprising filtering the first signal and the second signal to remove noise.

14. The device of claim 8, wherein a difference between the second point in time and the first point in time is less than 2 milliseconds.

15. A non-transitory computer-readable medium having stored thereon a sequence of instructions that, when executed by a processor, causes the processor to perform operations comprising:

configuring a threshold time interval for a light detecting and ranging (LIDAR) system coupled to an autonomous vehicle, the threshold time interval configured to permit the LIDAR system to, as the autonomous vehicle is moving, emit a first laser pulse and a second laser pulse within the threshold time interval and hit a vehicle on a roadway based on an expected velocity of the vehicle;

emitting the first laser pulse using the LIDAR system coupled to an autonomous vehicle, the first laser pulse being emitted at a first point in time;

receiving a first signal reflected off of the vehicle on the roadway;

emitting a second laser pulse using the LIDAR system, the second laser pulse being emitted at a second point in time within the configured time interval;

receiving a second signal reflected off of the vehicle on the roadway;

determining a first time of flight information of the first signal;

determining a second time of flight information of the second signal; and determining a velocity of the vehicle on the roadway based at least in part on the first time of flight information and the second time of flight information.

16. The non-transitory computer-readable medium of claim 15, wherein the first laser pulse has a first azimuth, and wherein the second laser pulse has a second azimuth, the second azimuth being the same as the first azimuth.

17. The non-transitory computer-readable medium of claim 16, wherein the first laser pulse has a first elevation, and wherein the second laser pulse has a second elevation, the second elevation being the same as the first elevation.

18. The non-transitory computer-readable medium of claim 15, wherein determining the velocity of the vehicle on the roadway comprises:

calculating a first distance between the LIDAR system and the vehicle on the roadway based at least in part on the first time of flight information;

calculating a second distance between the LIDAR system and the vehicle on the roadway based at least in part on the second time of flight information;

determining a difference between the first point in time and the second point in time to determine a time interval; and determining the velocity of the vehicle on the roadway based at least in part on the first distance, second distance, and the time interval.

19. The non-transitory computer-readable medium of claim 15, wherein the LIDAR system is a stacked LIDAR system comprising a first LIDAR device and a second LIDAR device stacked on the first LIDAR device, wherein the first LIDAR device is configured to emit the first laser pulse having a first elevation using a first laser source, wherein the second LIDAR device is configured to emit the second laser pulse having a second elevation using a second laser source, wherein the first elevation is offset from the second elevation, and wherein the first LIDAR device and the second LIDAR device are phase-delayed.

20. The non-transitory computer-readable medium of claim 15, wherein a difference between the second point in time and the first point in time is less than 2 milliseconds.

* * * * *